Patented Nov. 25, 1941

2,264,103

UNITED STATES PATENT OFFICE 2,264,103

PROCESS AND PRODUCT FOR SOFTENING HARD WATER

Nathaniel Beverly Tucker, Glendale, Ohio, assignor to The Procter & Gamble Company, Cincinnati, Ohio, a corporation of Ohio No Drawing. Application June 6, 1936, Serial No. 84,009

16 Claims. (Cl. 210—23)

This invention relates to the softening of hard water and the lessening of precipitation of soap in hard water and has for its principal object the softening of water without precipitation.

Another object is to increase the efficiency of sudsing, washing, and rinsing operations.

Another object is to reduce the amount of soap or other detergent required for sudsing and cleansing in hard water.

Another object is to prevent deposition of lime soap during rinsing processes.

Another object is to make concentrated solutions of soap for use as liquid soaps which will remain clear even when made with hard water.

Soft water is necessary or desirable for many other purposes in connection with the use of soap, such as for example, the prevention of precipitation on fabrics, hair, glassware, etc., during washing or during the subsequent rinsing operation, the prevention of formation of a ring of dirt around the wash basin, bath tub, etc., and the prevention of spots on clothes, or uneven application of dyes in dyeing operations; also for some purposes where soap is not used, such as the prevention of scale in steam boilers, etc.

In referring to water or "hard water" in this specification, I mean a grade of water suitable, aside from the presence of hardness constituents, for laundry, or domestic, or steam boiler uses, which is substantially neutral or slightly alkaline, and in any event does not contain noticeable quantities of free mineral acids. It is further intended that liquids containing such water, for example dye baths or other solutions, shall be referred to herein for convenience simply as "water." The term "soap" as used herein, unless otherwise qualified, means any soap suitable for detergent purposes.

The precipitation of soap by the hardness constituents of water, especially calcium and magnesium, is a cause of great wastefulness in the use of soap. Any soap thus reacted and precipitated is rendered useless as regards sudsing and cleansing action, so that the harder the water, the more soap is wasted in this way, and in some hard waters more soap is thus wasted than is available for actual sudsing and cleansing. The insoluble soaps precipitated by hard water are commonly designated collectively as "lime soap," although actually soaps of magnesium, iron, aluminum and other metals besides calcium may also be present. Hence, any means effective to convert such hardness constituents to another form so as to render the same incapable of reacting with soap is highly desirable and advantageous. The actual removal of the hardness constituents can be accomplished by precipitating them with suitable chemical reagents and filtering, or by the well-known "Zeolite" base exchange process, without filtering. The water can also be freed from these constituents by distillation. These procedures, however, are expensive in operation and require considerable equipment and supervision. Therefore, various attempts have been made to find other means of preventing the reaction between ordinary soaps and the hardness constituents of water without actually removing these constituents from solution in the water. For this purpose the use of sodium metaphosphate and sodium pyrophosphate has been proposed, but as far as I am aware, no one has previously discovered the effectiveness of salts of certain organic acids for this purpose.

I have discovered that the efficiency of soap in hard water can be increased, and precipitation lessened or prevented, by addition to the water of soluble salts of organic acids containing three or more carboxyl groups per molecule. By soluble salts I mean salts of these acids with either organic or inorganic bases which are soluble in water at 20° C. to the extent of one-half percent or more. Some examples of polycarboxylic acids within the scope of my invention are citric acid, acetyl citric acid, tricarballylic acid, aconitic acid, mellitic acid, the tetracarboxylic acid prepared from ethyl chloracetate by the malonic ester synthesis, and the penta-carboxylic acid prepared from ethyl aconitate by the malonic ester synthesis. Only a few organic acids containing four or more carboxyl groups per molecule are well-known, but I have prepared several such acids containing four, five, and six carboxyl groups respectively, and find that their soluble salts in all cases are effective in my process. I also find that polycarboxylic acids having substituted groups, especially the hydroxyl group, are also effective and in many cases even superior to the corresponding unsubstituted acids. The soluble salts may be prepared by reaction of the acid with a suitable base, for example by adding to any of the above acids in aqueous solution, an aqueous solution of any alkali metal hydroxide, ammonium hydroxide or an organic nitrogen base such as ethylene diamine, triethanolamine and mono-amyl-amine, for instance. For forming salts of my polycarboxylic acids for use in conjunction with soap, the amount of base used should be sufficient to produce a solution of such pH value that decomposition of soap therein to precipitate acid soap is precluded; it is not always necessary to completely neutralize all of the carboxyl groups.

Hard water when treated with any of the above mentioned reagents is softened without forming a precipitate, and the water thus softened is neutral or slightly alkaline in reaction, has a pH value which can be controlled within reasonable limits, is mild in its action on the skin, fabrics and painted surfaces, and possesses a considerable solvent power for lime soap.

The effect of soluble citrates in decreasing the concentration of calcium ions in solution without precipitation has been known, but it has not been previously known, as far as I am aware, that citrates are also efficient as soap builders, nor that substituted citric acids and other organic acids, forming the group herein described, are also effective as soap builders and in softening hard water.

In carrying out my process I merely add to the hard water, or to the solution of soap in hard water, a sufficient quantity of one of my reagents selected from the group mentioned.

By a "sufficient quantity" I mean enough to render the water suitable for its intended purposes. This may be judged by various means, such as soap titration, observation of the clarity of the solution, or by a practical trial of the softened water for its intended purpose. A complete softening, although sometimes desirable, is in many cases not necessary.

One important application of my invention is in the making of so-called liquid soaps which ordinarily consist of an aqueous solution of the potassium soap of coconut oil in a concentration usually about 10 to 15 percent, or in the preparation of a concentrated base for making such liquid soaps, such a base often containing as much as 30 or 40 percent of actual soap. In place of coconut oil, other oils of the coconut oil group, characterized by high saponification number and low average molecular weight of the fatty acids, may be used; palm kernel oil is another well-known member of this group. Oils other than those of the coconut oil group may also be used for making liquid soaps. Such solutions if made with hard water are turbid and therefore objectionable for sale and use. For this reason it has been heretofore necessary to use either distilled water or a chemically softened water. However, the addition in sufficient proportion of any of my reagents to such a solution made with hard water renders the solution clear without the expense of distilling or otherwise softening the water. Smaller proportions of my reagents will render such soap solutions less turbid if not actually clear.

Another important application is in the saving of soap in laundering operations. The soap concentration in solutions for laundering is usually very low, such as about .2% to .5%, for example, but when made with hard water a considerable proportion of the soap used may be precipitated by the hardness constituents before enough soap becomes available to exert the desired sudsing and cleansing effect. The use of my reagents in such solutions lessens, or even prevents, the precipitation of soap, so that a reduced quantity of soap suffices to produce the required sudsing in hard water, thus making important savings in the amount of soap required. It is well-known that sudsing is considered an essential preliminary to cleansing in laundering operations and is the laundryman's usual criterion of the amount of soap to use. Experience has led him to expect little cleansing effect until he has added enough soap to the water to produce a satisfactory suds.

In rinsing baths after laundering with soap, my reagent is also of valuable assistance because when added to hard water used for rinsing it reduces or prevents the precipitation on the garments of soap remaining from the previous washing bath. Other rinse operations where a water softened by my procedure can be used to advantage are, for example, the rinsing of the hair after washing with soap, rinsing of dairy milk bottles, other glassware and dishes, etc.

Similarly in other operations where a wetting effect is required, such as in dyeing, the use of my reagent is of value in preventing precipitation of soap used for its wetting properties.

Some other uses of water thus softened are, for example, in the canning industry, in cooling the hot cans by immersion in water where ordinary hard water gives a dull appearance to the cans due to precipitation of lime; in the manufacture of artificial ice; in the use of water in steam boilers and feed lines to same, and in hot water distributing systems; in all these cases a water thus softened has many advantages over hard water.

My reagents can be used for softening water not only for use with soap but with any cleansing, wetting, sudsing, and emulsifying agent, such as for example the various forms of sulfated alcohols and sulfonated detergents now quite commonly used as soap substitutes.

The following examples, Tables #1 and #2, show the effect of the use of a number of different reagents within the scope of my invention on soap solutions of different concentrations and in water of different degrees of hardness. The hardness in the tables indicates the equivalent amount of calcium carbonate in grains per gallon. In these particular cases an artificial hardened water was prepared, using calcium chloride as the hardening agent.

TABLE I

*Sudsing tests with sodium coconut oil soap in hard water at 90° F.*

| Reagent | Hardness | Percent reagent | Percent soap* | Hardness | Percent reagent | Percent soap* |
|---|---|---|---|---|---|---|
| Sodium Citrate | 7 | 0 | .17 | 21 | 0 | .35 |
|  |  | .2 | .14 |  | .2 | .32 |
|  |  | .4 | .13 |  | .4 | .29 |
|  |  | .8 | .11 |  | .8 | .26 |
| Triethanol ammonium Citrate | 7 | 0 | .17 | 21 | 0 | .35 |
|  |  | .2 | .12 |  | .2 | .33 |
|  |  | .4 | .11 |  | .4 | .31 |
|  |  | .8 | .10 |  | .8 | .27 |
| Ethylene diammonium Citrate | 7 | 0 | .17 | 21 | 0 | .35 |
|  |  | .2 | .11 |  | .2 | .27 |
|  |  | .4 | .08 |  | .4 | .19 |
|  |  | .8 | .05 |  | .8 | .10 |
| Amyl ammonium Citrate | 7 | 0 | .17 | 21 | 0 | .35 |
|  |  | .2 | .14 |  | .2 | .31 |
|  |  | .4 | .11 |  | .4 | .27 |
|  |  | .8 | .06 |  | .8 | .23 |

*"Percent soap" indicates the minimum concentration of soap to produce a lasting suds under standard test conditions.

The figures in the above table show clearly the reduced amount of soap requisite to produce a lather when any one of the reagents shown is added to a hard water, and the especial effectiveness of ethylene di-ammonium citrate in this respect.

TABLE 2

*Cloudiness in liquid soap solutions of potassium coconut oil soap in hard water at 90° F.*

| Reagent | 10% soap solutions | | 15% soap solutions | |
|---|---|---|---|---|
| | Percent reagent | Max. hardness* | Percent reagent | Max. hardness* |
| Sodium Citrate | | | 0 | 0 |
| | | | 3 | 2 |
| | | | 5 | 3 |
| | | | 10 | 10 |
| Triethanol ammonium Citrate | 0 | 0 | 0 | 0 |
| | 3 | 1 | 3 | 2 |
| | 5 | 2 | 5 | 5 |
| | 10 | 12.5 | 10 | 15 |
| Ethylene Di-ammonium Citrate | 0 | 0 | 0 | 0 |
| | 3 | 2.5 | 3 | 4 |
| | 5 | 10 | 5 | 8 |
| | 7.5 | 25 | 7.5 | 25 |
| Amyl Ammonium Citrate | | | 0 | 0 |
| | | | 3 | 5 |
| | | | 5 | 12.5 |

*"Max. hardness" indicates the maximum hardness of the water which will give a clear solution with the amount of each reagent as shown.

The figures in the above table show clearly that with increasing amounts of each of the reagents shown, water of correspondingly increased hardness may be used in making liquid soap solutions and yet have a clear solution.

Other examples showing the use of acids with more than three carboxylic groups per molecule are as follows.

*Example 3.*—A tetracarboxylic acid was prepared as follows. Two mols of ethyl chloracetate were reacted with one mol of malonic ester in sodium methylate solution according to the method of Bischoff, Ber. 13, 2161. The ester thus formed was saponified with alcoholic potassium hydroxide and the potassium salt separated from the alcoholic solution. When 10% of a salt of this acid, having the empirical formula $C_3H_4(COOH)_4$, was added to a 15% solution of a potassium coconut oil soap in hard water (10 grains hardness), it was found to give clear solutions at temperatures above 110° F. and only slightly turbid solutions at room temperature. A similar experiment using 5 grain water gave a clear solution at room temperature. The corresponding soap solutions without the addition of my reagent were in all cases very turbid.

A sudsing test with the above reagent resulted as follows. The water was of 7 grain hardness containing a ratio of calcium to magnesium equal to 2.9:1. After adding .4% of the above mentioned salt to the water, only .11% of a sodium coconut oil soap was required to give a lasting suds under standardized conditions, as compared with .21% without this reagent.

*Example 4.*—A penta-carboxylic acid was prepared in the following manner. Diethyl malonate was condensed with ethyl aconitate. (See Berichte 26, 364 and 27, 1115), in sodium methylate solution. The ester of the pentacarboxylic acid thus formed was saponified with an aqueous solution of potassium hydroxide and converted to the insoluble barium salt by precipitation with barium chloride. The barium salt after washing and drying was decomposed with sodium sulfate, filtered from the barium sulfate thus formed, and the sodium salt of the penta-carboxylic acid having the formula $C_4H_5(COOH)_5$, was then obtained in substantially pure form on evaporation of the solution.

In a sudsing test in 7 grain water, the same as described under Example 3, after adding 1% of the sodium salt of the penta-carboxylic acid a lasting sudsing was obtained with the use of only .11% of sodium coconut oil soap, as compared with .21% of the soap required without this reagent.

*Example 5.*—A tetracarboxylic acid was produced from the penta-carboxylic ethyl ester produced in the first part of Example 4 by hydrolyzing same with aqueous hydrochloric acid. This acid hydrolysis eliminates one carboxyl group as $CO_2$, giving a mixture of isomeric butane tetra-carboxylic acids.

A sudsing test made with the same water previously mentioned showed that the addition of 1% of the sodium salt of this tetracarboxylic acid to the water permitted a lasting suds to be obtained with the use of only .09% of sodium coconut oil soap as compared with .21% of the soap required in the absence of this reagent.

*Example 6.*—A solution containing .3% of sodium tallow soap in an artificial hard water containing calcium chloride equivalent to 21 grains calcium carbonate per gallon was very turbid, but a similar solution with the addition of 4.5% of monoamyl ammonium citrate is perfectly clear at room temperature.

*Example 7.*—The value of these salts in rinsing water is shown in this example. Glass plates were first washed in a .4% solution of sodium tallow soap in hard water having a hardness of 25 grains. They were then rinsed in 25 grain hard water, some with and some without the addition of one of my reagents as a rinsing aid to the water. The plates were then individually compared with a similar clean glass plate which had been washed with soap in distilled water, rinsed with distilled water, and wiped dry with a clean cloth, to determine the relative amount of light transmitted after the respective treatments as measured by means of a transmission photoelectric apparatus. The figures below show in terms of micro-amperes, as given by the photoelectric cell, the difference between the light transmission of a clean plate and that of the washed and rinsed plate in each case. The higher numbers indicate a greater difference in transmission between the clean plate and the washed and rinsed plate, and thus indicate a greater deposition of lime soap or other material on the glass. All the plates were first washed in a .4% sodium tallow soap, as previously mentioned, and then rinsed at 80° C. as follows.

| | Difference |
|---|---|
| Hard water at 25 grains hardness | 47 |
| Hard water at 25 grains hardness+.2% sodium citrate | 27 |
| Hard water at 25 grains hardness+.5% sodium citrate | 13 |
| Hard water at 25 grains hardness+.8% sodium citrate | 6 |
| Hard water at 25 grains hardness+.2% ethylene diammonium citrate | 28 |
| Hard water at 25 grains hardness+.8% ethylene diammonium citrate | 3 |

These figures clearly show the greatly reduced amount of deposit on the glass when rinsed with hard water containing varying percentages of some of my reagents. The examples shown are typical, and similar results are obtained with other salts derived from other bases and other acids in the group previously described.

The effect of these reagents on the use of different soaps in hard water varies in degree, but I find the effect especially pronounced and valuable in the case of soaps made of coconut oil in whole or in part.

My reagents are suitable for use as builders in connection with soaps or other organic detergent substances, such as for example the soluble salts of sulfuric esters of higher aliphatic alcohols and the soluble salts of sulfonated alcohols, hydrocarbons and other similar substances having detergent properties. In such cases my reagent may be mixed with the detergent in suitable proportions before use.

I believe that the reason for the peculiar action of these reagents in lessening the precipitation of soap in hard water is that the ions of these organic acids having three or more carboxyl groups per molecule tend to unite with alkaline earth and/or heavy metal ions in such a way as to form slightly dissociated complex ions, thereby decreasing the activity of the alkaline earth and/or metal ions.

In using these reagents, an excess does no harm, but the minimum required for complete effectiveness can readily be determined by experiment. This minimum in each case will depend on the hardness of the water, the concentration of soap, the kind of soap used, the nature of the organic acid containing three or more carboxyl groups per molecule, the base used with such organic acid, and the temperature. However, any of the salts in the group mentioned, even in proportions below that required for complete effectiveness, will have an effect in at least partly clarifying concentrated solutions of soap, or in reducing the amount of soap required for sudsing in solutions of low concentration such as are used in laundering, or in decreasing the formation of a scum of lime soap or a ring around the tub when the salt is added to the tub or basin of water used for bathing or for shampooing the hair, or in lessening the precipitation of lime soap on the skin, hair, fabrics, glassware, or other materials washed and rinsed in hard water.

These salts can also be used advantageously in conjunction with the more common alkaline soap builders such as soda ash, sodium silicate, trisodium phosphate, etc.

Having thus described my invention, what is claimed as new and desired to be secured by Letters Patent is:

1. The process of softening hard water without causing a precipitate which comprises adding to said water a water-soluble salt derived from an organic acid selected from the group consisting of acetyl citric acid, tricarballylic acid, aconitic acid, and organic aliphatic acids containing more than three carboxyl groups per molecule, and a base selected from the group consisting of the alkali metal bases, ammonia, and organic nitrogen bases.

2. The process of increasing the efficiency of sudsing, washing and rinsing operations in hard water in which soap is present which comprises adding to said water a water-soluble salt derived from an organic acid selected from the group consisting of acetyl citric acid, tricarballylic acid, aconitic acid and organic aliphatic acids containing more than three carboxyl groups per molecule, and a base selected from the group consisting of the alkali metal bases, ammonia, and organic nitrogen bases, the pH value of said salt in solution being sufficiently great to prevent the precipitation of acid soap.

3. The process of increasing the efficiency of sudsing, washing and rinsing operations in hard water in which soap is present which comprises adding to said water an ethylene di-ammonium salt of citric acid, the pH value of said salt in solution being sufficiently great to prevent the precipitation of acid soap.

4. The process of reducing the turbidity of a concentrated solution of soap in hard water for use as liquid soap which comprises adding to said solution a sufficient quantity of a water-soluble salt derived from an organic aliphatic acid selected from the group consisting of acetyl citric acid, tricarballylic acid, aconitic acid and organic acids containing more than three carboxyl groups per molecule and a base selected from the group consisting of the alkali metal bases, ammonia, and organic nitrogen bases, the pH value of said salt in solution being sufficiently great to prevent the precipitation of acid soap.

5. The process of reducing the turbidity of a concentrated solution of soap in hard water for use as liquid soap which comprises adding to said solution a sufficient quantity of an ethylene di-ammonium salt of citric acid, the pH value of said salt in solution being sufficiently great to prevent the precipitation of acid soap.

6. A builder, for organic detergents, substantially devoid of detergent properties, but capable of improving the efficiency of an organic detergent in hard water and capable of softening hard water without causing a precipitate, comprising a water-soluble salt of an organic acid selected from the group consisting of acetyl citric acid, tricarballylic acid, aconitic acid, and organic aliphatic acids containing more than three carboxyl groups per molecule, and a base selected from the group consisting of the alkali metal bases, ammonia, and organic nitrogen bases.

7. A detergent composition comprising an organic detergent substance and a builder substantially devoid of detergent properties but capable of improving the efficiency of an organic detergent in hard water and capable of softening water without causing a precipitate, said builder comprising a water soluble salt derived from an organic acid selected from the group consisting of acetyl citric acid, tricarballylic acid, aconitic acid and organic aliphatic acids containing more than three carboxyl groups per molecule and a base selected from the group consisting of the alkali metal bases, ammonia, and organic nitrogen bases, the pH value of said salt in solution being sufficiently great to prevent the formation of acid soap when used in conjunction with a soap detergent in solution.

8. The process of softening hard water without causing a precipitate which comprises adding to said water an ethylene diammonium salt of citric acid.

9. A detergent composition comprising a detergent soap and a builder substantially devoid of detergent properties but capable of improving the efficiency of soap in hard water and capable of softening water without causing a precipitate, said builder comprising a water soluble salt derived from an organic acid selected from the group consisting of acetyl citric acid, tricarballylic acid, aconitic acid and organic aliphatic acids containing more than three carboxyl groups per molecule and a base selected from the group consisting of the alkali metal bases, ammonia, and organic nitrogen bases, the pH value of said salt in solution being sufficiently great to prevent the precipitation of acid soap when used in conjunction with a soap detergent in solution.

10. A detergent composition comprising a water soluble salt of a sulfuric ester of a higher aliphatic alcohol having detergent properties and a builder substantially devoid of detergent properties but capable of improving the efficiency of a soluble salt of a sulfuric ester of a higher aliphatic alcohol in hard water and capable of softening water without causing a precipitate, said builder comprising a water soluble salt derived from an organic acid selected from the group consisting of acetyl citric acid, tricarballylic acid, aconitic acid and organic aliphatic acids containing more than three carboxyl groups per molecule and a base selected from the group consisting of the alkali metal bases, ammonia, and organic nitrogen bases.

11. A detergent composition comprising a water soluble salt of a sulfonated hydrocarbon having detergent properties and a builder substantially devoid of detergent properties but capable of improving the efficiency of a soluble salt of a sulfonated hydrocarbon in hard water and capable of softening water without causing a precipitate, said builder comprising a water soluble salt derived from an organic acid selected from the group consisting of acetyl citric acid, tricarballylic acid, aconitic acid and organic aliphatic acids containing more than three carboxyl groups per molecule and a base selected from the group consisting of the alkali metal bases, ammonia, and organic nitrogen bases.

12. As an article of manufacture, a water softener comprising an ethanolamine citrate.

13. A process of preparing and softening water for use in sudsing, washing and rinsing operations which comprises introducing therein an organic detergent material and an ethanolamine citrate.

14. A detergent composition comprising as the essential ingredients soap and an ethanolamine citrate, the pH value of the ethanolamine citrate in solution being sufficiently great to prevent the precipitation of acid soap.

15. A process of softening water which comprises introducing therein an ethanolamine citrate.

16. The process of reducing the turbidity of a concentrated solution of soap in hard water for use as liquid soap which comprises adding to said solution a sufficient quantity of an ethanolamine citrate, the pH value of the ethanolamine citrate in solution being sufficiently great to prevent the precipitation of acid soap.

NATHANIEL BEVERLY TUCKER.